United States Patent [19]

Hazel et al.

[11] 4,428,075
[45] Jan. 24, 1984

[54] METHODS OF PREFORMATTING AN OPTICAL DISK

[75] Inventors: Robert L. Hazel; John E. Kammerud, both of Thousand Oaks, Calif.

[73] Assignee: Burroughs Corporation, Detroit, Mich.

[21] Appl. No.: 333,125

[22] Filed: Dec. 21, 1981

[51] Int. Cl.³ .............................................. G11B 7/00
[52] U.S. Cl. ................... 369/45; 346/76 L; 346/108; 346/54; 369/111; 369/275
[58] Field of Search ......... 369/44, 45, 46, 54, 369/58, 93, 94, 95, 111, 121, 122, 275, 100, 108; 346/76 L, 135.1; 358/342; 365/215, 234; 372/23

[56] References Cited

U.S. PATENT DOCUMENTS

| | | | |
|---|---|---|---|
| 4,085,423 | 4/1978 | Tsunoda et al. | 369/45 |
| 4,145,758 | 3/1979 | Drexler et al. | 369/44 |
| 4,150,398 | 4/1979 | Kojima et al. | 369/121 X |
| 4,298,974 | 11/1981 | Tsunoda et al. | 369/45 |
| 4,301,527 | 11/1981 | Tsunoda et al. | 369/45 |
| 4,331,976 | 5/1982 | Kinjo et al. | 358/342 |
| 4,334,300 | 6/1982 | Arquie et al. | 369/46 |
| 4,363,116 | 12/1982 | Kleuters et al. | 369/44 |

*Primary Examiner*—Donald McElheny, Jr.
*Attorney, Agent, or Firm*—Nathan Cass; Kevin R. Peterson; David G. Rasmussen

[57] ABSTRACT

A method for preformatting each track of an optical disk with spaced header patterns using a plurality of overlapping, individually modulated writing laser beams arranged in a line perpendicular to the track. All of the writing laser beams are derived from a single multi-line laser so as to provide high positioning stability, and adjacent beams are chosen to have different wavelengths in order to prevent the deleterious effects of coherent interference between the overlapping beams. A specific header pattern is provided on a single pass by turning on different ones of the writing beams during specific time periods as each header recording area is traversed. A laser read-after-write beam is additionally provided to permit immediate verification of the recorded header pattern.

7 Claims, 8 Drawing Figures

METHODS OF PREFORMATTING AN OPTICAL DISK

CROSS REFERENCE TO RELATED PATENT APPLICATIONS

This patent application contains subject matter related to the concurrently filed commonly assigned patent application Ser. No. 333,055 for Apparatus for Preformatting An Optical Disk and also to the commonly assigned copending patent applications Ser. No. 311,628 now U.S. Pat. No. 4,402,061; Ser. No. 311,629; Ser. No. 311,630; and Ser. No. 311,745, all filed Oct. 15, 1981.

BACKGROUND OF THE INVENTION

This invention relates generally to optical memory systems, and more particularly to improved methods for preformatting optical media prior to use in an optical memory system.

As is well recognized, it is of crucial importance in an optical memory system that reliable and accurate positioning and focusing control be provided during recording and reproducing operations. This requirement is a particularly severe one in an optical memory system because of the very high data recording density typically employed, as compared, for example, to magnetic memory disk systems.

One way of providing for reliable and accurate positioning and focusing control in an optical memory system is to preformat the optical media—that is, prerecord on the optical media specific optically detectable indications which can be used during reading and writing to achieve the desired accuracy and reliability. Such indications may, for example, comprise timing indications, track following indications, focusing indications, address indications, etc. A typical formatting pattern is illustrated, for example, in the aforementioned commonly assigned patent applications and will be summarized later on herein.

BRIEF SUMMARY OF THE PRESENT INVENTION

A broad object of the present invention is to provide particularly advantageous methods for preformatting optical media for use in an optical memory system, such as, for example, is disclosed in the aforementioned patent applications.

More specific objects of the invention are to provide methods for providing precise, high resolution complex formatting patterns on optical media in a single pass, within a reasonably fast time period, and with the capability of verifying the recorded format.

In a particular preferred embodiment, the present invention is advantageously employed to provide a predetermined preformatting arrangement for a rotatable optical disk on which a large plurality of concentric tracks are to be provided for use in a system such as disclosed in the aforementioned commonly assigned patent applications. For this purpose, the preferred embodiment of the present invention employs a plurality of independently modulated writing beams of different wavelengths derived from a single multi-line laser. The use of a single multi-line laser provides the resulting writing laser beams with high positioning stability, while the use of different wavelengths for the writing laser beams permits the writing beams to be focused closely adjacent to one another for precisely forming high resolution complex formatting patterns on the optical disk. A read-after-write laser beam is also provided for verifying the format recorded by the writing laser beams.

The specific nature of the invention as well as other objects, advantages, features and uses thereof will become evident from the following description of a preferred embodiment taken in conjunction with the accompanying drawings.

DETAILED DESCRIPTION OF THE INVENTION

Like numerals and characters designate like elements throughout the figures of the drawings.

Figure 1:
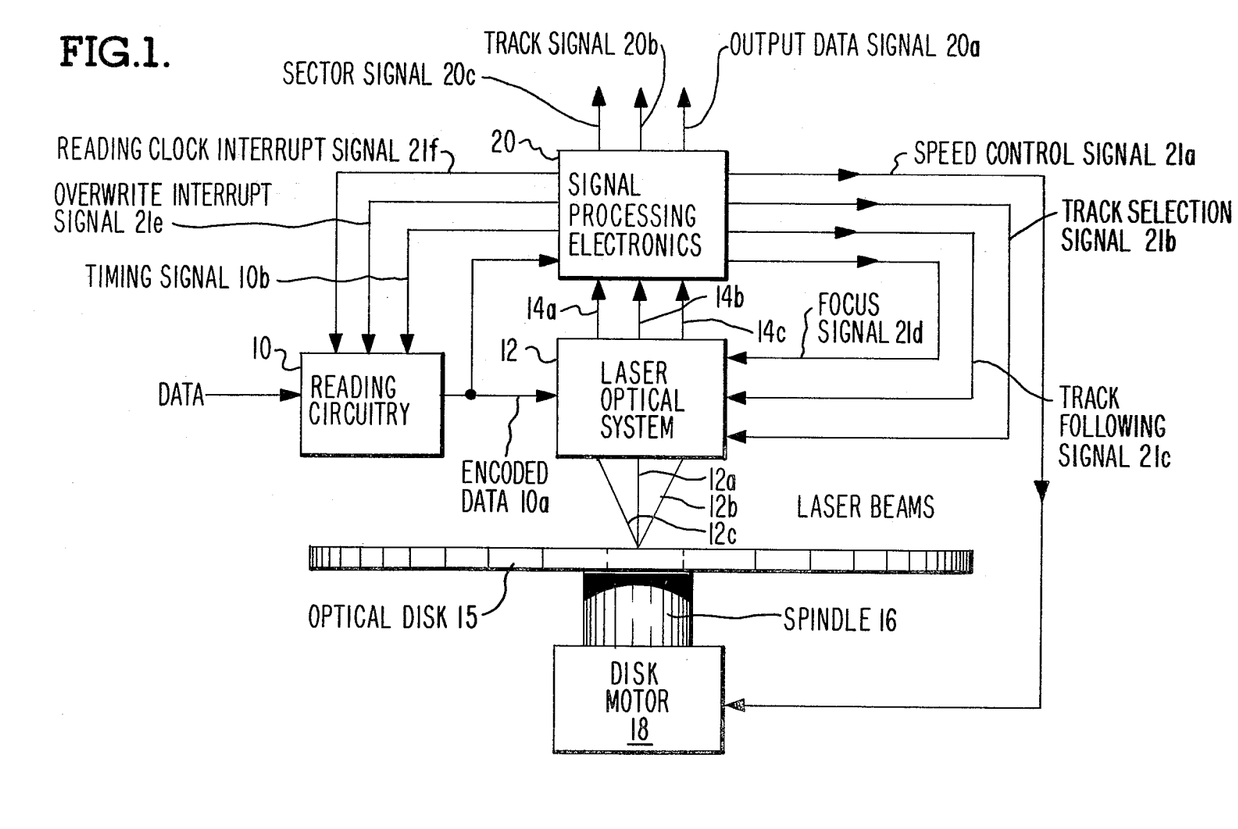
FIG. 1 is an overall block diagram of an optical recording and reproducing system incorporating a preferred embodiment of the present invention.

Reference is initially directed to FIG. 1, which generally illustrates the basic portions of the preferred embodiment of an optical recording and reading system disclosed in the aforementioned commonly assigned copending patent applications. The data to be recorded is first applied to recording circuitry 10 which encodes the applied data using, for example, a conventional encoding format of the type employed for magnetic recording, such as non-return-to-zero, return-to-zero, etc. Conventional error checking may also be provided for the encoded signal.

The encoded data 10a from the recording circuitry 10 is applied to a laser optical system 12. The laser optical system 12 generates three laser beams 12a, 12b and 12c which are focused at spaced locations along the center line of the same selected track of a preformatted optical disk 15 supported on a precision spindle 16 for rotation by a motor 18. The optical disk 15 may, for example, be a trilayer disk of the type disclosed in the aforementioned U.S. Pat. No. 4,222,071 and in the aforementioned article by Bell, et al.

Laser beam 12a is a writing beam which is modulated by the encoded data so as to form optically detectable changes in a selected track of the optical disk 15 representative of the encoded data. It is to be understood that the optically detectable changes produced in the disk by the write laser beam 12a need not be physical changes, such as pits or physical holes. The only requirement is that optically detectable changes be produced in selected areas of the disk in response to the write laser beam 12a which are representative of the encoded data 10a. For the purpose of this description, all of the possible types of optically detectable changes that can be produced will hereinafter be referred to as optical holes.

Figure 2:
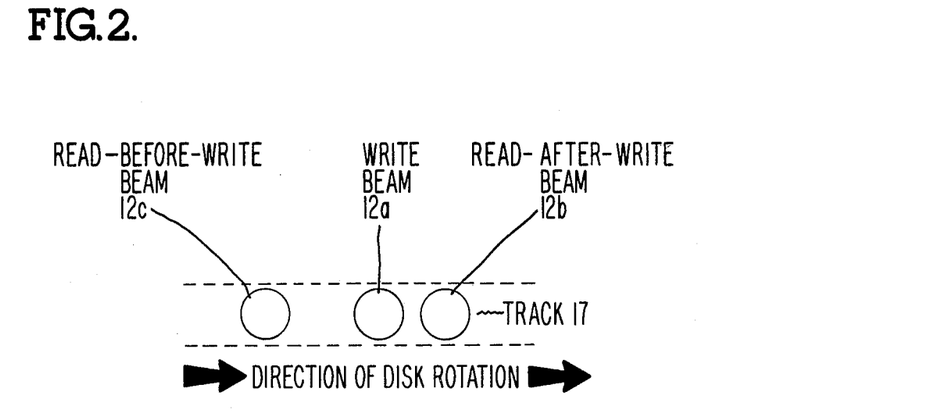
FIG. 2 illustrates the relative locations of the three laser beams provided by the system of FIG. 1 when focused on a selected track of the optical disk.

Laser beams 12b and 12c shown in FIG. 1 are reading beams. As typically illustrated in FIG. 2, the reading beam 12b is a read-after-write beam which is accordingly focused behind the writing beam 12a on the center line 17a of a selected track 17, while the reading beam 12b is a read-before-write beam and is accordingly focused ahead of the writing beam 12a. The intensity of the read beams 12b and 12c are chosen so that they will not disturb the integrity of previously recorded information. The read beams are reflected from the disk 15 back to the optical system 12 which, in response thereto, derives a plurality of detection signals 14a, 14b and 14c which are applied to signal processing electronics 20. The signal processing electronics 20 also receives the encoded data signal 10a from the recording circuitry 10 for use in checking the accuracy of recorded data, as will hereinafter be considered.

The signal processing electronics 20 uses the detected signals 14a, 14b and 14c to provide an output data signal 20a corresponding to data read from the optical disk 15, along with signals 20b and 20c respectively identifying the track and sector locations on the disk from which the data is read. The signal processing electronics 20 also produces control signals 10b, 21a, 21b, 21c, 21d, 21e and 21f. More specifically, control signal 10b is applied to the recording circuitry 10 for synchronizing the encoding of data with disk rotation; control signal 21a is applied to the optical disk motor 18 to provide accurate speed control during recording and reading; control signal 21b is applied to the laser optical system 12 for controlling the radial position of the laser beams 12a, 12b and 12c for the purpose of selecting a desired track; control signal 21c is applied to the laser optical system 12 for providing precise track following of the laser beams on the selected track; control signal 21d is applied to the laser optical system 12 for providing precise focusing of the laser beams 12a, 12b and 12c; and control signal 21e is applied to the recording circuitry 10 for interrupting recording if the reflected read-before-write beam indicates the possibility of an overwrite recording error because the track ahead contains previously recorded data; and signal 21f is applied to the recording circuitry 10 to interrupt recording if a recording error occurs.

Figure 3:
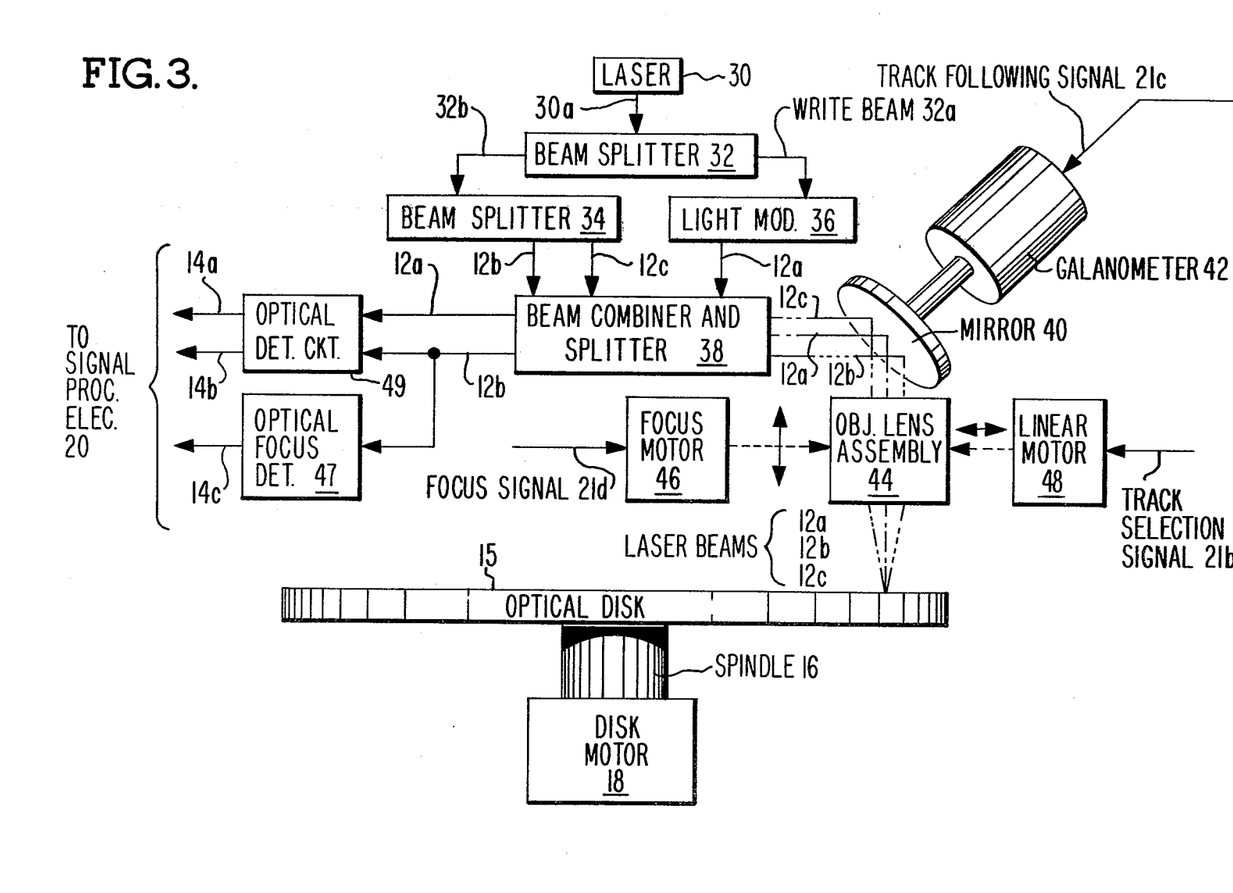
FIG. 3 is a block and schematic representation of the laser optical system shown in FIG. 1.

Reference is next directed to FIG. 3 which illustrates a preferred embodiment of the laser optical system 12 generally shown in FIG. 1. The various components of this laser optical system are illustrated in block and schematic form in FIG. 3 since their implementation can readily be provided by those skilled in the art.

As shown in FIG. 3, a laser 30 provides a beam 30a having a wavelength of, for example, 633 nanometers and a power level of, for example, 12 mw. This laser beam 30a is applied to a first beam splitter 32 which splits the beam into a high power beam 32a and a low power beam 32b. The low power beam 32b is applied to a second beam splitter 34 which further splits the beam 32b to provide read-after write and read-before-write beams 12b and 12c, respectively. It is to be understood that a separate laser could be employed for providing one or more of the above beams if so desired.

The high power beam 32a in FIG. 3 is applied to a high speed light-modulator 36 which modulates the beam 32a in response to the encoded data 10a provided at the output from the recording circuitry 10 in FIG. 1. As also shown in FIG. 3, the resulting modulated high power beam at the output of the modulator 36 is used as the write beam 12a (FIG. 1) of the system and is applied to a beam combiner and splitter 38 along with the read beams 12b and 12c. The resulting three laser beams 12a, 12b and 12c produced at the output of the beam combiner and splitter 38 are then reflected off of a detectable mirror 40 mounted to a galvanometer 42 which receives the track following signal 21c from the signal processing electronics 20 (FIG. 1). After reflection from the mirror 40, the laser beams 12a, 12b and 12c are applied to the disk 15 via an objective lens assembly 44. The objective lens assembly 44 is coupled to a focusing motor 46 which receives the focusing signal 21d from the signal processing electronics 20. Also coupled to the objective lens assembly 44 is a linear motor 48 which receives the track selection signal 21b from the signal processing electronics 20.

As further shown in FIG. 3, the reflected. read beams 12b and 12c pass back to the beam combiner and splitter 38 via the objective lens assembly 44 and the mirror 40. The beam combiner and splitter 38 directs the reflected beams to optical detection circuitry 49 which converts the beams into corresponding read-after-write and read-before-write analog electrical signals 14a and 14b which are applied to the signal processing electronics 20 as shown in FIG. 1. Also, at least one of the reflected read beams 12a and 12b is applied to a geometric optical focus detector 47 which provides a relatively low gain, wide capture range signal 14c to the signal processing electronics 20 which is indicative of the quality of focusing of the beams on the selected track.

Next to be considered is the preformatting provided for the optical disk 15 in FIG. 1. An example of a typical preformatting arrangement is illustrated in FIGS. 4 and 5.

Figure 4:
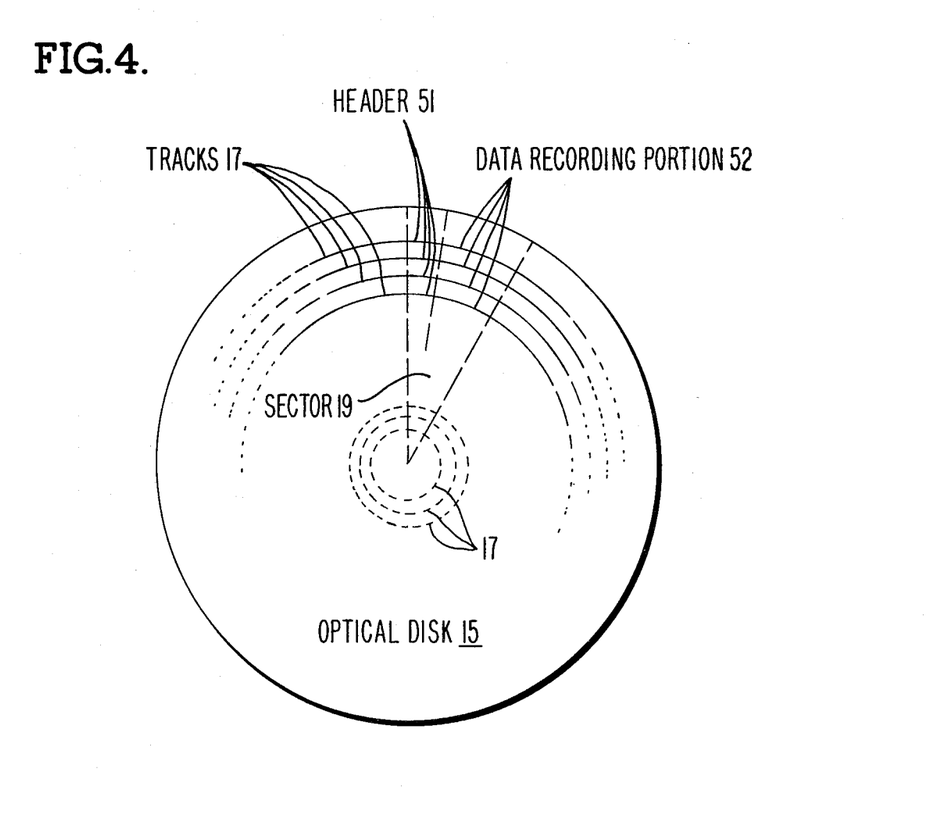
FIG. 4 is a schematic diagram generally illustrating the arrangement and formatting of data on the optical disk.

As generally indicated in FIG. 4, the optical disk 15 in the preferred embodiment being described contains a large plurality of circumferential tracks 17. The disk 15 is also divided into a plurality of sectors 19. As indicated in FIG. 4, each track 17 within a sector 19 comprises a header 51 and a data recording portion 52. The data recording portion 52 is the portion into which data is written during recording and comprises the greater portion of the track length within each sector 19. The header 51 of a track 17 is encountered first in each sector 19 and is provided on the disk prior to recording. A disk provided with such headers 51 is typically referred to as being preformatted.

Figure 5:
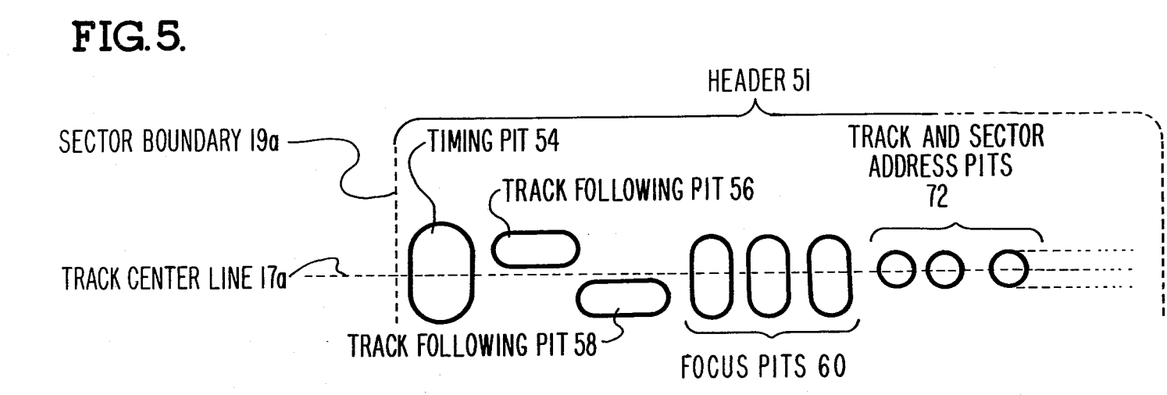
FIG. 5 is a schematic diagram illustrating details of the header formatting shown in FIG. 4.

FIG. 5 illustrates an example of a preformatted header 51 provided for each track 17 in each sector 19 of the disk 15 of FIG. 3. Although the optical holes constituting the header 51 need not be physically observable, as mentioned previously, it will be assumed for the purposes of this description that physical holes, such as pits, are employed for the exemplary header shown in FIG. 4. It will also be assumed that a pit exhibits a relatively high reflectance to an incident beam while other undisturbed disk areas exhibit a relatively low reflectance. It is to be understood that an arrangement may also be employed in which a portion of the optical recording is provided using physical holes, such as pits, and the remaining recorded portions are recorded using optical holes.

Figure 7:
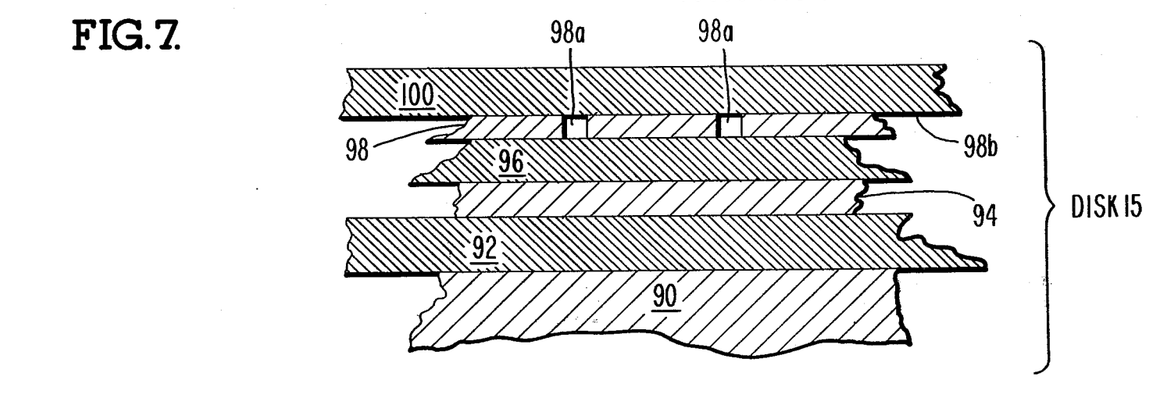
FIG. 7 is a cross-sectional view illustrating the construction of an optical disk employed in the system of FIG. 1.

Before continuing with the description of the header shown in FIG. 5, reference is directed to FIG. 7 which illustrates a cross-section of a disk 15 which may be employed in the system of FIG. 1. A supporting substrate 90 such as a 0.1 to 0.3 inch thick disk of aluminum is coated with an organic smoothing layer 92 of, for example, 20–60 microns prior to deposition thereon of a highly reflective opaque layer 94 of aluminum which may, for example, have a thickness of 400–800 Angstroms. An inorganic dielectric layer 96 such as a 800–1200 Angstrom layer of silicon dioxide which is transparent at the laser frequency is deposited over the aluminum reflector layer 94. An absorbing layer 98 which is absorptive at the laser frequency is then deposited over the dielectric layer 96. This absorbing layer 98 may for example be a 50 to 300 Angstrom layer of a metal such as tellurium. Finally, the absorbing layer 98 is overcoated with a protective layer 100, such as a silicon resin having a thickness of, for example, 150 to 500 microns.

Still with reference to FIG. 7, an anti-reflection (dark mirror) condition for a laser beam incident on unrecorded portions of the disk 15 is produced by appropriately choosing the thicknesses and optical characteristics of the layers 94, 96 and 98. Recording on such a disk 15 as illustrated in FIG. 7 is then accomplished by employing an appropriately focused, intensity-modulated recording laser beam (such as laser beam 12a in FIGS. 1 and 2) which records information by forming optically detectable changes, such as pits 98a, in the absorbing layer 98 along a selected track, the spacing and dimensions of these pits 98a being representative of the recorded data. Information is read from the disk 15 using an appropriately focused reading laser beam (such as laser beams 12b and 12c in FIGS. 1 and 2) which is chosen to be of insufficient intensity to affect unrecorded regions 98b of the absorbing layer 98 and has a frequency at which these unrecorded regions 100 exhibit the previously mentioned anti-reflection condition. As a result, the reflected reading beam will be intensity modulated by the pits 98a since the reading beam will experience a relatively high reflection when the beam is incident on a pit 98a, and a relatively low reflection when the reading beam is incident on an unwritten region 98b. It will be understood that dust particles on the upper surface of the protective layer 100 will be far removed from the focal plane of the optical system (that is, they will be out of focus) so as to have a negligible effect on the above described recording and reading operations.

Reference is now directed back to FIG. 5 for a more detailed consideration of the header 51. As shown in FIG. 5, immediately following the left sector boundary 19a is a relatively large pit 54 providing a relatively large change in optical reflectance which is used to provide synchronized timing for the signal processing electronics 20. Following pit 54 are two pits 56 and 58 elongated in a direction parallel to the track 17 and disposed on opposite sides of the track center line 17a in a staggered relationship. These pits 56 and 58 are used by the signal processing electronics 20 in FIG. 1 to provide precise track following.

Following the elongated pits 56 and 58 in the exemplary header 51 shown in FIG. 5 are a plurality of pits 60 elongated perpendicularly to the track center line 17a. The locations and dimensions of the pits 60 are chosen so that the reflected signal obtained upon traversing these pits 60 will have a value dependent upon the quality of focusing of the incident beam.

The focusing pits 60 are followed by address pits 72 recorded so as to provide an identification of the particular track and sector being traversed by the laser beams. In other words, the pits 72 represent a track and sector address which can be provided using conventional encoding techniques, such as for example is used for identifying tracks and sectors on magnetic disks. In the particular example illustrated in FIG. 5, these pits 72 which provides track and sector address identification are the last portion of the header 51, the remaining portion of the track in the sector 19 thereby being available for recording data.

As pointed out previously, the resulting disk containing these headers is considered to be preformatted. Such preformatted disks will typically be provided to users who will make use of the preformatted headers in conjunction with signal processing electronics 20, such as illustrated in FIG. 1, for recording and reading data in the data recording portion 52 of each track 17 in each sector 19.

Having thus described the optical memory and preformatting arrangements employed in the embodiment disclosed in the aforementioned commonly assigned copending patent applications, preferred methods and apparatus in accordance with the invention will next be described illustrating how headers of the type illustrated in FIG. 5 are provided for an optical disk 15 such as illustrated in FIG. 4. However, it is to be understood that the present invention is also applicable for providing other types of formatting arrangements using pits and/or other types of optical holes, and also is applicable for writing various other types of patterns in addition to headers on an optical disk.

Figure 6:
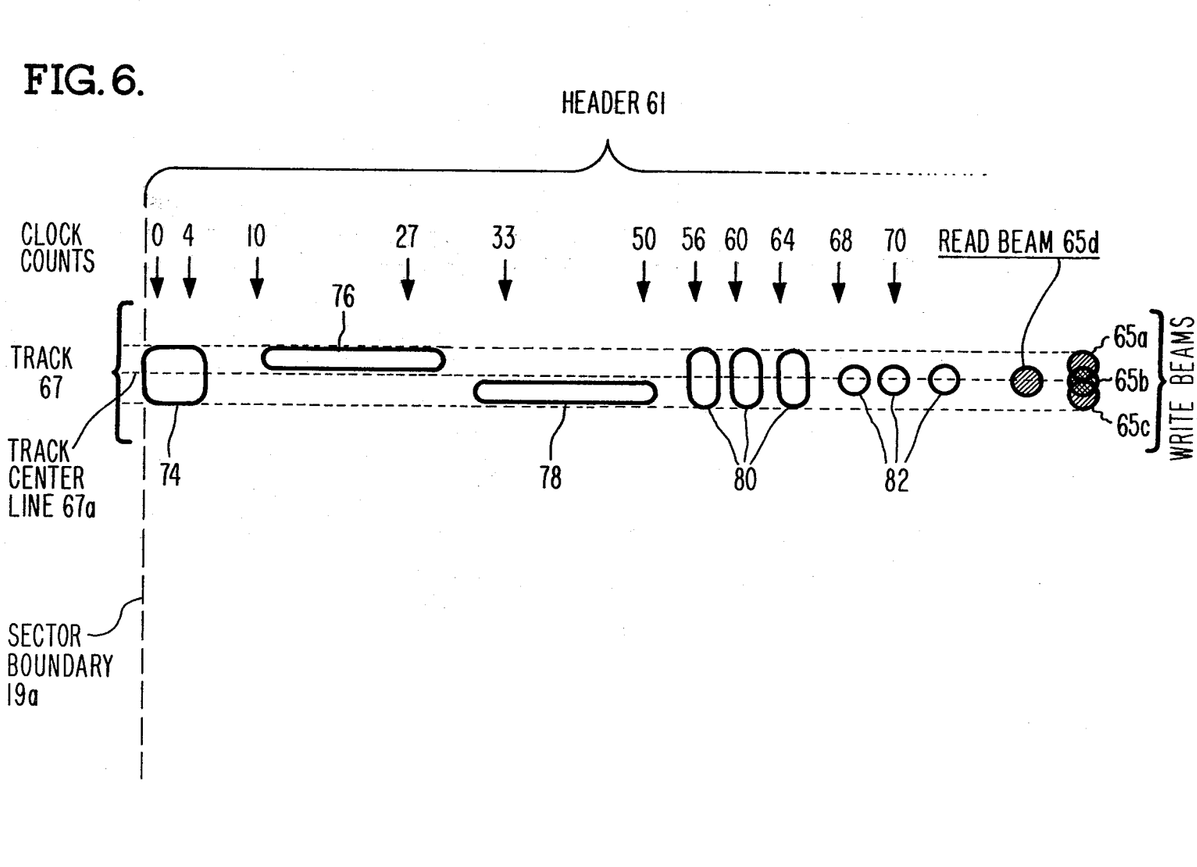
FIG. 6 is a schematic diagram of a specific exemplary header which will be used to illustrate how formatting is provided in accordance with the invention.

Accordingly, referring now to FIG. 6, illustrated therein is the specific exemplary header 61 which will be used to illustrate the construction and operation of the preferred embodiment of the invention to be described. FIG. 6 also diagrammatically illustrates the relative positioning and sizes of four focussed laser beams 65a, 65b, 65c and 65d which are provided by the preferred embodiment for use in writing and verifying the illustrated header 61. These laser beams 65a, 65b, 65c and 65d are shown in FIG. 6 in the position they would have after forming and verifying the header 61 in a single pass of the illustrated track 67.

Considering the laser beams 65a–65d in FIG. 6 in more detail, the three beams 65a, 65b and 65c are writing beams and are located in a genreally perpendicular line across the track 67 with an overlapping relationship to one another. The writing beams 65a, 65b and 65c are arranged in this manner in order to provide for writing the particular header 61 shown in FIG. 6. More specifically, as will be understood from FIG. 5, the timing pit 74 is formed by simultaneously turning on all three of the laser writing beams 65a, 65b and 65c during clock counts 0–4; the upper track following pit 76 is formed by turning on only the laser writing beam 65a during clock counts 10–27; the lower track following pit 78 is formed by turning on only the laser writing beam 65c during clock counts 33–50; the focus pits 80 are formed by simultaneously turning on all three of the laser writing beams 65a, 65b and 65c during respective clock counts 56, 60 and 64; and the track and sector address pits 82 are formed by turning on just the middle laser writing beam 65b during respective clock counts 70, 72, 74, etc. Provision is made for verifying the accuracy of the recorded header 61 immediately after each part of the header is formed using laser beam 65d which functions as a read-after-write beam.

As will be evident from the foregoing, the writing of the timing pit 74 and the focus pits 80 requires that all three of the writing beams 65a, 65b and 65c be turned on simultaneously in order to form these pits 74 and 80 in a single pass. In such a case, it is important that coherent interference between the writing beams be prevented, since it can produce interference fringes which will significantly detract from the quality and accuracy of recording. Coherent interference is prevented in the preferred embodiment by choosing adjacent ones of the writing beams 65a–65c of different wavelengths. For example, the inner writing beam 65b may be chosen to have a wavelength of 488 nanometers (blue), while the outer writing beams 65a and 65c may each be chosen to have a wavelength of 514 nanometers (green). Of course, the use of different wavelengths for the writing beams will require that the incident power of each beam be adjusted to account for any deviation from the optimum recording frequency of the optical medium. The reading beam 65d may have any suitable wavelength appropriate for reading optical holes recorded on the disk. In the preferred embodiment the reading beam 165d is chosen to have a wavelength of 495.6 nanometers.

Another way of solving the problem of coherent interference between writing beams without using different wavelengths is to stagger the beams 65a, 65b and 65c in a direction parallel to the track 67 by an amount sufficient to prevent coherent interference. In such a case, the writing beams 65a, 65b and 65c no longer appear as a single elongated writing beam to the optical recording medium which detracts from the quality and preciseness of the recording obtained when staggered beams are employed. Thus, where high quality precise recording headers are required, the use of different wavelength writing beams in a single line as shown in FIG. 6 is preferred.

Another problem associated with the use of writing beams 65a–65c, such as illustrated in FIG. 6, involves providing sufficient positioning stability of these writing beams (relative to one another) so as to achieve the desired preciseness of recording. A high degree of positioning stability is achieved in the preferred embodiment by employing a single laser to provide all of the beams. Since different frequency writing beams are also employed in the preferred embodiment, all of the beams are derived from a multi-line laser, such as an argon laser which provides a laser beam containing, for example, wavelengths of 488 nanometers (blue), 514 nanometers (green) and 496.5 nanometers (blue-green).

Figure 8:
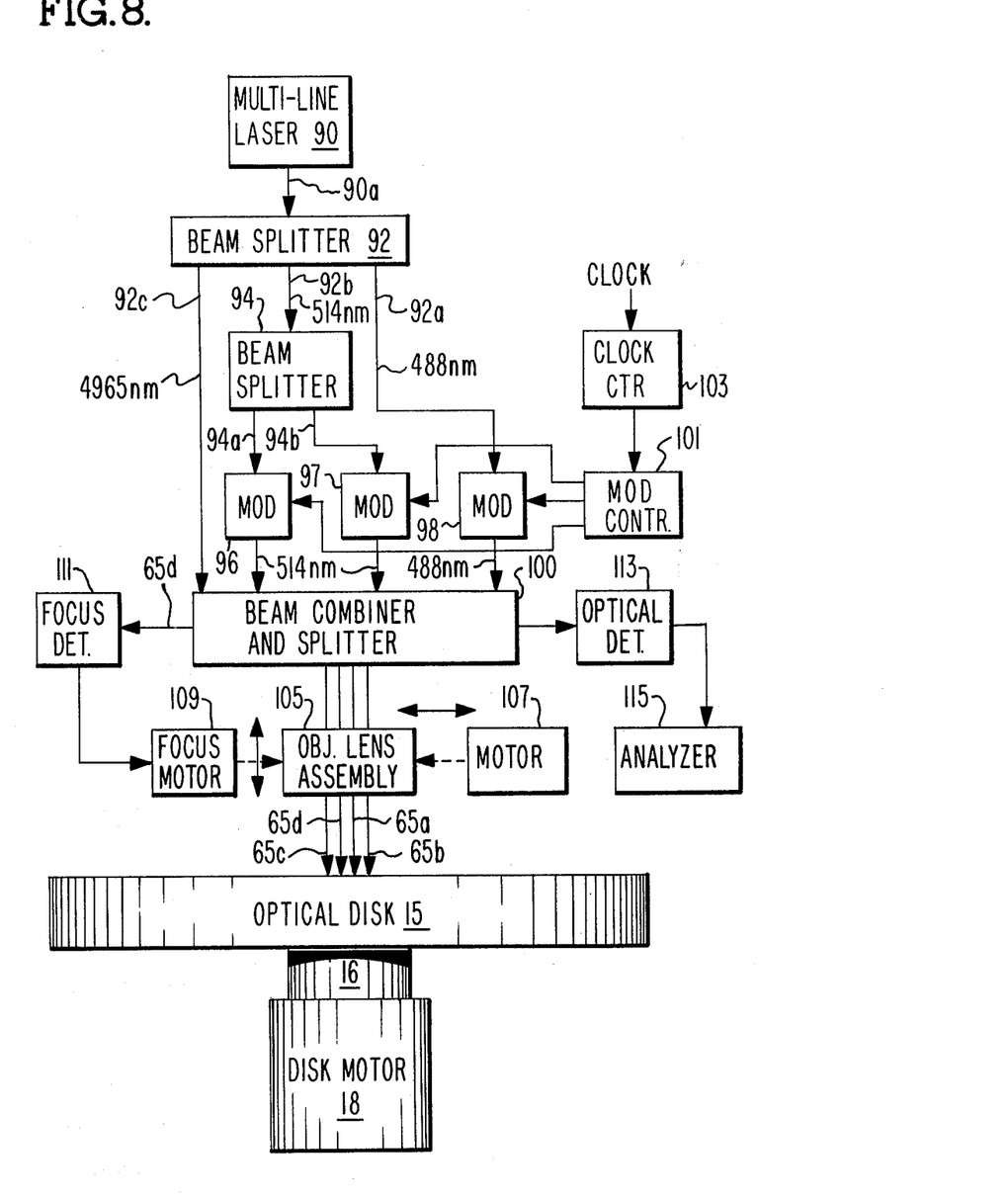
FIG. 8 is a block and schematic representation of a preferred embodiment for providing formatting in accordance with the invention.

Referring now to FIG. 8, illustrated therein is preferred apparatus in accordance with the invention for providing the laser beams 65a, 65b, 65c and 65d in FIG. 6 along with the appropriate operations for causing these laser beams to write the header 61 as described above. The various components of the apparatus illustrated in FIG. 7 are shown in block and schematic form, since their implementation can readily be provided by those skilled in the art, as will be evident from the aforementioned references.

The source of all of the laser beams 65a, 65b, 65c and 65d is a multi-line laser 90 shown in FIG. 8, such as an argon laser containing wavelengths of 488 nanometers (blue), 514 nanometers (green) and 496.5 nanometers (blue-green). In the preferred embodiment, the 514 nanometer wavelength is used for the outer writing beams 65a and 65c in FIG. 6, the 488 nanometers wavelength is used for the middle writing beams 65b, and the 496.5 nanometers wavelength is used for the reading beam 65d.

As shown in FIG. 8, the output beam 90a from the multi-line laser 90 is applied to a beam splitter 92 which splits the beam 90a into two relatively high power write beams 92a and 92b having wavelengths of 488 nanometers and 514 nanometers, respectively, and a relatively low power read beam 92c having a wavelength of 496.5 nanometers. The writing beam 92b is applied to another beam splitter 94 which splits the beam 92b into two 514 nanometers writing beams 94a and 94b. The resulting two 514-nanometer writing beams 94a and 94b and the 488-nanometer writing beam 92a are each applied to a beam combiner and splitter 100 via a respective one of the separately controlled high speed light modulators 96, 97 and 98, which may for example be acousto-optical digital modulators. The 496.5 nanometer read beam 92c is directly applied to the beam combiner and splitter 100 for appropriate combination with the write beams.

As shown in FIG. 8, each of the modulators 96, 97 and 98 is separately controlled by a modulator controller 101 in response to a clock counter 103. The control provided by the modulator controller 101 is such as to selectively turn on and off the single 488-nanometer writing beams 92a and the two 514-nanometer writing beams 94a and 94b for the appropriate time periods indicated in FIG. 6 so as to produce the particular header 61 shown, as described previously.

The beam combiner and splitter 100 appropriately combines the beams applied thereto taking into account the relative spacings of their respective focussed spots on the optical disk as shown in FIG. 6. The resulting beams at the output of the beam combiner and splitter 100 are applied to an objective lens assembly 105 which focuses the resulting four beams 65a, 65b, 65c and 65d on the disk. The objective lens assembly 105 is precisely positionable to a track on the disk by a motor 107 which is referenced to a laser interferometer. Proper focussing is maintained using a focusing motor 109 coupled to the objective lens assembly 105. The focusing motor is controlled in response to the output of a geometric focus detector 111 which receives the reflected read beam 65d from the beam combiner and splitter 100. The focus detector 111 provides an output to the focus motor 109 appropriate for moving the objective lens assembly 105 relative to the disk so as to maintain the beams in focus on the disk as the disk is rotated.

The reflected read beam 65d provided by the beam combiner and splitter 100 is also applied to an optical detector 113 and then to an analyzer 115 for determining whether the header has been properly recorded. The detected read beam signal provided by the optical detector 113 may be analyzed in various ways known in the art.

Although the present invention has been described in connection with a particular preferred embodiment it is to be understood that the invention is subject to many modifications and variations in construction, arrangement and use without departing from the true scope of the invention. Accordingly, the present invention is to be considered as encompassing all possible modifications and variations coming within the scope of the appended claims.

What is claimed is:

1. A method for precisely recording to predetermined pattern in a track on an optical medium during a single pass of the track, wherein said pattern contains portions having different sizes and locations relative to a direction perpendicular to said track, said method comprising:
- providing a single optical radiation source capable of providing radiation at at least first and second different wavelengths;
- deriving at least first and second writing beams having said first and second wavelengths from said source;
- combining and focusing said first and second writing beams onto said medium so that the focused spots formed by said beams on said medium are located along a line substantially perpendicular to said track such that the spot of one writing beam partially overlaps the spot of the other writing beam;
- relatively moving said medium and said writing beams so that said focused spots move along said track; and
- individually modulating said first and second writing beams while said spots are moving along said track so that both of said writing beams are simultaneously turned on during a first time period and only one of said beams is turned on during a second time period which is different from said first time period.

2. The invention in accordance with claim 1, wherein said optical radiation source is a multi-line laser.

3. The invention in accordance with claim 1 or 2, wherein said method includes focusing a read-after-write beam on said track along with said writing beams for verifying the pattern written by said writing beams.

4. The invention in accordance with claim 3, wherein said predetermined pattern includes an optical timing hole, first and second optical track following holes, and address optical holes, wherein all three of said writing beams are turned on during a first predetermined time period in order to form said timing hole, wherein only one of the outer writing beams is turned on during a second predetermined time period in order to form said first track following hole, wherein only the other outer writing beam is turned on during a third predetermined time period in order to form said second track following hole, and wherein only the middle writing beam is turned on during spaced predetermined time periods in order to form said address holes.

5. The invention in accordance with claim 1, wherein said method includes:
- deriving a third writing beam from said source and combining and focusing said third writing beam along with said first and second writing beams so that said third writing beam forms a third focused spot along said line partially overlapping one of the other spots; and
- individually modulating said third writing beam so that it is turned on during a third time period.

6. The invention in accordance with claim 5, wherein said third writing beam has a different wavelength from that of the adjacent writing beam whose spot it partially overlaps.

7. The invention in accordance with claim 1, wherein said medium is a rotatable optical disk and wherein the step of relatively moving comprises rotating said disk.

* * * * *

UNITED STATES PATENT AND TRADEMARK OFFICE
CERTIFICATE OF CORRECTION

PATENT NO. : 4,428,075

DATED : January 24, 1984

INVENTOR(S) : Robert L. Hazel and John E. Kammerud

It is certified that error appears in the above-identified patent and that said Letters Patent is hereby corrected as shown below:

Col. 6, line 9, change "provides" to --provide--;

line 48, change "genreally" to --generally--.

Col. 8, line 67, change "to" to --a--.

Signed and Sealed this

Tenth Day of April 1984

[SEAL]

Attest:

GERALD J. MOSSINGHOFF

Attesting Officer

Commissioner of Patents and Trademarks